US011953162B1

(12) United States Patent
Zhao

(10) Patent No.: US 11,953,162 B1
(45) Date of Patent: Apr. 9, 2024

(54) LAMPWICK PLUG ASSEMBLY AND LED BULB

(71) Applicant: Bing Zhao, Shenzhen (CN)

(72) Inventor: Bing Zhao, Shenzhen (CN)

( * ) Notice: Subject to any disclaimer, the term of this patent is extended or adjusted under 35 U.S.C. 154(b) by 0 days.

(21) Appl. No.: 18/231,485

(22) Filed: Aug. 8, 2023

(51) Int. Cl.
*F21K 9/238* (2016.01)
*F21K 9/232* (2016.01)

(52) U.S. Cl.
CPC .............. *F21K 9/238* (2016.08); *F21K 9/232* (2016.08)

(58) Field of Classification Search
CPC .......... F21K 9/238; F21K 9/232; F21K 9/235; F21Y 2115/10; F21Y 2103/10; F21S 4/28; F21V 17/10; F21V 31/005; F21V 31/04; F21V 25/00; H01L 25/0753
USPC ................. 315/46, 71; 362/249.02, 363, 810
See application file for complete search history.

(56) References Cited

U.S. PATENT DOCUMENTS

| | | | | |
|---|---|---|---|---|
| 9,863,589 B2 | 1/2018 | Moon | | |
| 9,966,696 B2 | 5/2018 | Cheng | | |
| 2022/0136660 A1* | 5/2022 | Huang | F21K 9/232 | 362/363 |

FOREIGN PATENT DOCUMENTS

| | | | | |
|---|---|---|---|---|
| CN | 107448790 A | * 12/2017 | F21K 9/232 |
| CN | 113405032 A | * 9/2021 | |
| CN | 113915541 A | * 1/2022 | |
| CN | 218455169 U | * 2/2023 | F21S 4/28 |

OTHER PUBLICATIONS

Search English translation of CN 113915541 A (Year: 2022).*
Search English translation of CN-107448790-A (Year: 2017).*
Search English translation of CN 113405032 A (Year: 2021).*
Search English translation of CN 218455169 U (Year: 2023).*

* cited by examiner

*Primary Examiner* — Omar Rojas Cadima
(74) *Attorney, Agent, or Firm* — Georgi Korobanov

(57) ABSTRACT

Disclosed is a lampwick plug assembly, including an LED lampwick, a plug and a plug body; the plug body is plugged in the inner side of a through hole and is configured to fix the LED lampwick on the plug, the LED lampwick includes LED filament, and the LED filament is packaged with a conductive wire matching the resistance value. The lampwick plug assembly provided in the present disclosure can simplify the plug structure and reduces the production cost through a simple plug and plug body structure. The LED lampwick is fixed on the plug through the plug body, which facilitates the installation and mass production. In the structure, the resistor is packaged inside the LED filament, eliminating relevant structure and process of fixing the resistor, such that the structure can be widely used in the manufacturing process of existing LED bulbs.

3 Claims, 4 Drawing Sheets

LAMPWICK PLUG ASSEMBLY AND LED BULB

TECHNICAL FIELD

The present disclosure relates to the technical field of lighting device design, in particular to a lampwick plug assembly and an LED bulb.

BACKGROUND

With the rapid development of social economy, people raises higher and higher requirements for the quality of life, and demands for lighting atmosphere in daily life are accordingly increasing. Due to low cost but flexible styles, LED strip lights are very popular among the people, and atmosphere lights in outdoor scenes are widely applied. The greatest problem in the application of outdoor lighting is the waterproof problem of the lighting.

In the prior art, LED strip lights are generally composed of a plurality of LED bulbs fixed in the lamp holders and then connected by wires. An LED bulb is composed of an iron lamp holder, a lampshade, a conductive wire, a resistor, an LED lampwick and a plug through assembly. The lampshade has a chamber for accommodating components, and an opening that makes the chamber communicated with the outside is formed at one end of the lampshade body with a smaller cross-sectional area; the conductive wire is fixed on one end of a plug, the other end thereof has an opening of glue injection cavity, and the plug is fixed on the opening of the lampshade through outer steps of the opening of cavity. After the plug is fixed, waterproof glue is injected into the glue injection cavity of the plug, so as to realize the purposes of being waterproof and dustproof.

In the prior art, consideration should be given to not only the fixing of LED lampwick, but also the fixing of the resistor, as well as guarantee effective connection of the LED lampwick and the resistor for the above structure, which makes the overall structure complicated and the production process cumbersome, thereby being not conducive to mass production and manufacturing.

SUMMARY

The present disclosure provides an LED bulb to solve the technical problems in the prior art that the waterproof glue has poor waterproof effect due to unreasonable structural design, making the waterproof effect of the bulb unable to meet the expectations, and thus seriously affecting the service life and safety of the bulb.

The present disclosure provides a lampwick plug assembly, which includes an LED lampwick, a plug and a plug body, the plug body is plugged in the inner side of the through hole and is configured to fix the LED lampwick on the plug, the LED lampwick includes an LED filament, and the LED filament is packaged with a conductive wire matching the resistance value.

The lampwick plug assembly provided in the present application can simplify the plug structure and reduces the production cost through a simple plug and plug body structure. The LED lampwick is fixed on the plug through the plug body, which facilitates the installation and mass production. In the structure, the resistor in the prior art is packaged inside the LED filament, eliminating relevant structure and process of fixing the resistor, which can be widely used in the manufacturing process of existing LED bulbs.

On the basis of the above technical solutions, the present application can also be improved as follows:

Further, the LED lampwick includes a long metal wire, a short metal wire and LED filament, and the LED filament is packaged with a conductive wire matching the resistance value, the LED filament is arranged in an axial direction of the through hole, and has a near end and a far end. The long metal wire is connected to the far end and extends from the through hole to the outside of the plug, the short metal wire is connected to the near end and extends from the through hole to the outside of the plug, and the long metal wire and the short metal wire are both fixed on the plug through the plug body.

Further, the through hole is a hole with a rectangular cross section, grooves are formed on opposite sides of the inner wall of the through hole, the long metal wire and the short metal wire correspond to a groove respectively.

Further, a conical portion is formed at one end of the plug near the LED filament.

The present disclosure further provides an LED bulb, including a lampshade, a lamp holder and the lampwick plug assembly; the lampshade has a chamber for accommodating components of the LED lampwick; and an opening communicated with the chamber is formed at one end of the lampshade; the plug is mounted on the inner side of the opening, the through hole is communicated with the chamber, a glue injection surface is formed at the end of the plug away from the chamber, and the glue surface after glue injection is flush with the end face of the opening; and the lamp holder is covered at outer side of the opening of the lampshade.

For the LED bulb provided in the present disclosure, the glue injection surface after glue injection is flush with the end face of the lampshade opening through the position design of the glue injection surface, the waterproof structure is thus optimized, such that the glue can completely close the gap between the plug and the side of the opening, the inner chamber of the lampshade is isolated from the outer space of the lampshade, thereby achieving a better waterproof effect of components inside the bulb.

BRIEF DESCRIPTION OF DRAWINGS

In order to more clearly illustrate technical solutions in the embodiments of the present disclosure or in the prior art, a brief introduction to the accompanying drawings required for the description of the embodiments or the prior art will be provided below. Obviously, the accompanying drawings in the following description are only some of the embodiments of the present disclosure, and those ordinarily skilled in the art would also be able to derive other accompanying drawings from structures shown by these accompanying drawings without making creative efforts.

DETAILED DESCRIPTION

Typical embodiments that embody features and advantages of the present disclosure will be described in detail in the following description. It should be understood that the present disclosure can have various variations in different embodiments without departing from the scope of the present disclosure, and the description and illustrations therein are intended to be illustrative in nature, rather than limit the present disclosure.

Furthermore, the terms "first" and "second" are merely for the purpose of description, and cannot be construed as indicating or implying relative importance or implicitly specifying the number of technical features indicated. Thus, a feature defined with "first" and "second" may explicitly or implicitly include one or more of the features. In the description of the present application, "a plurality of" means two or more, unless otherwise expressly specified.

In the description of the present application, it should be noted that, unless otherwise explicitly specified and defined, the terms "arranged", "communicated" and "connected" should be understood in a broad sense, for example, they may be a fixed connection, a detachable connection, or an integrated connection; may be a mechanical connection, or an electrical connection; and may be a direct connection, or an indirect connection via an intermediate medium, or communication inside two elements. For those of ordinarily skilled in the art, specific meanings of the above terms in the present application could be understood according to specific circumstances.

Figure 1:
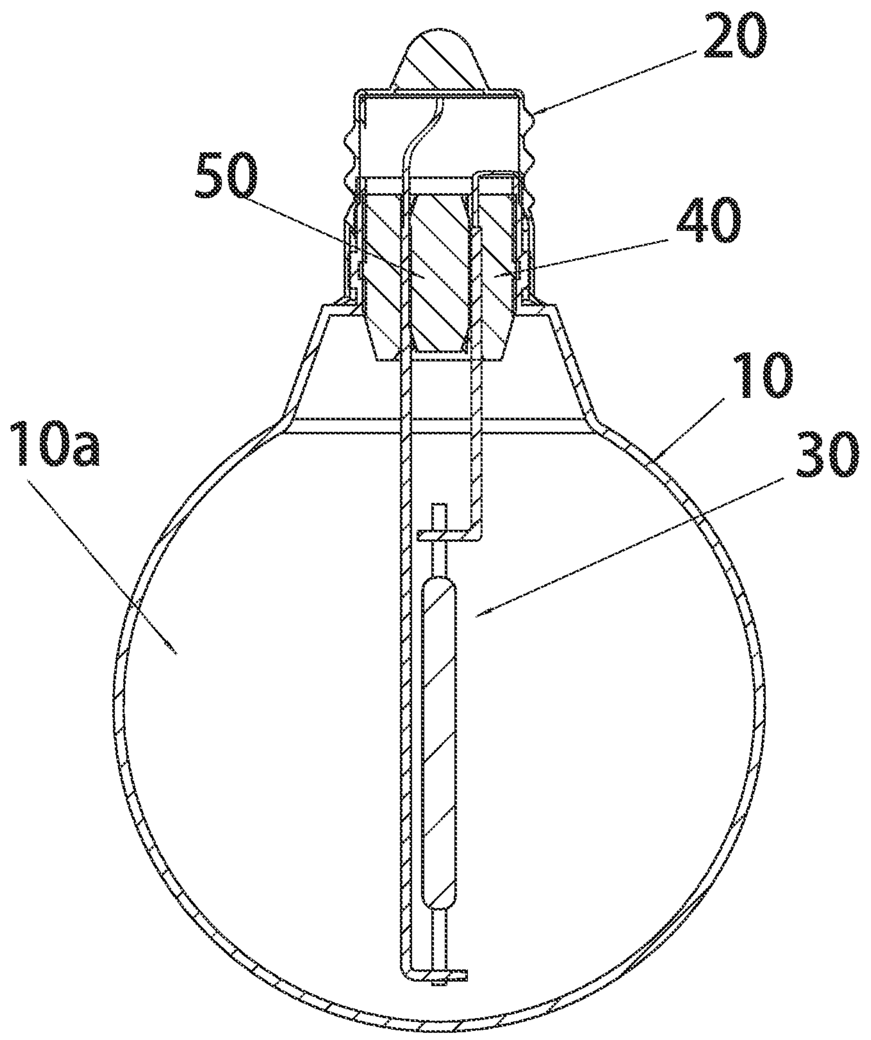
FIG. 1 is a structural schematic diagram of an LED bulb provided by an embodiment of the present disclosure.
Figure 2:
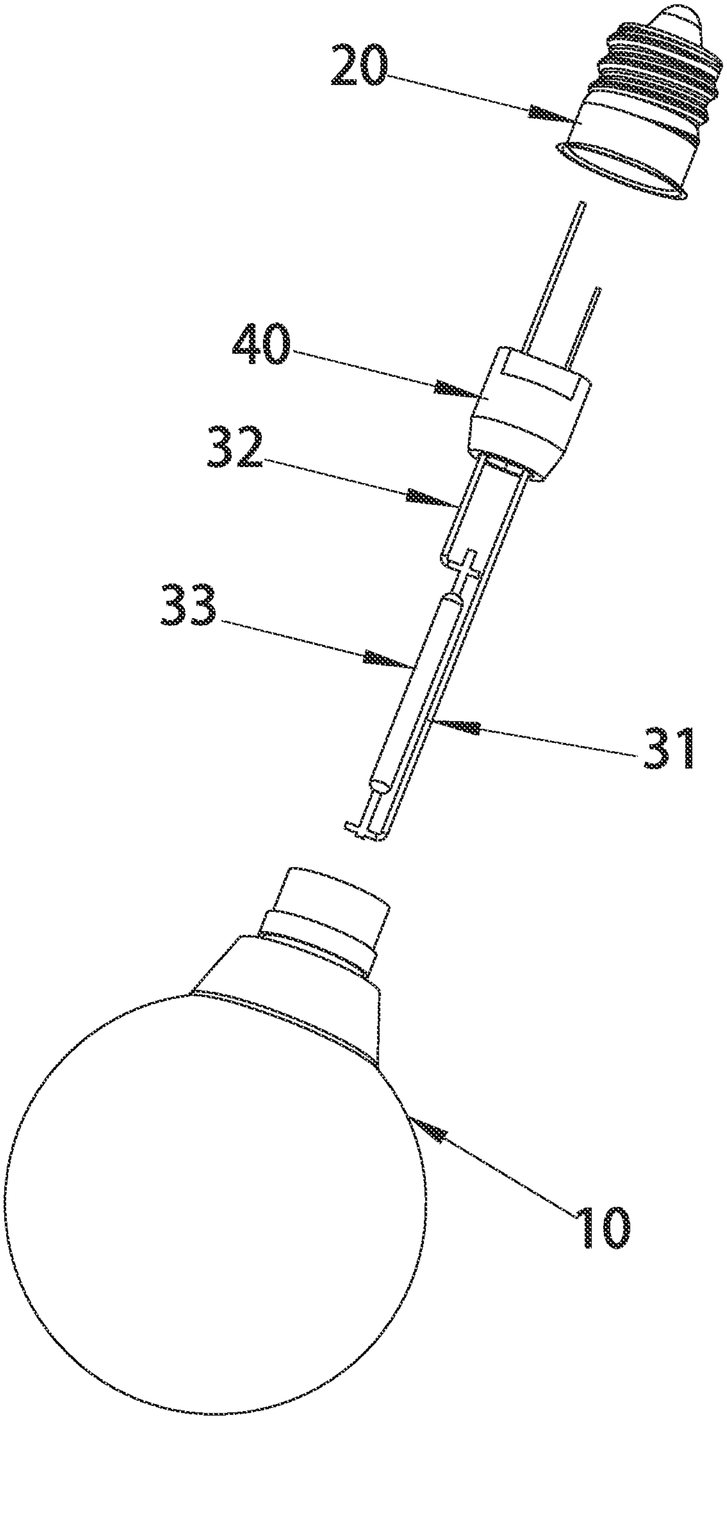
FIG. 2 is a schematic disassembly diagram of components of the LED bulb according to FIG. 1.
Figure 3:
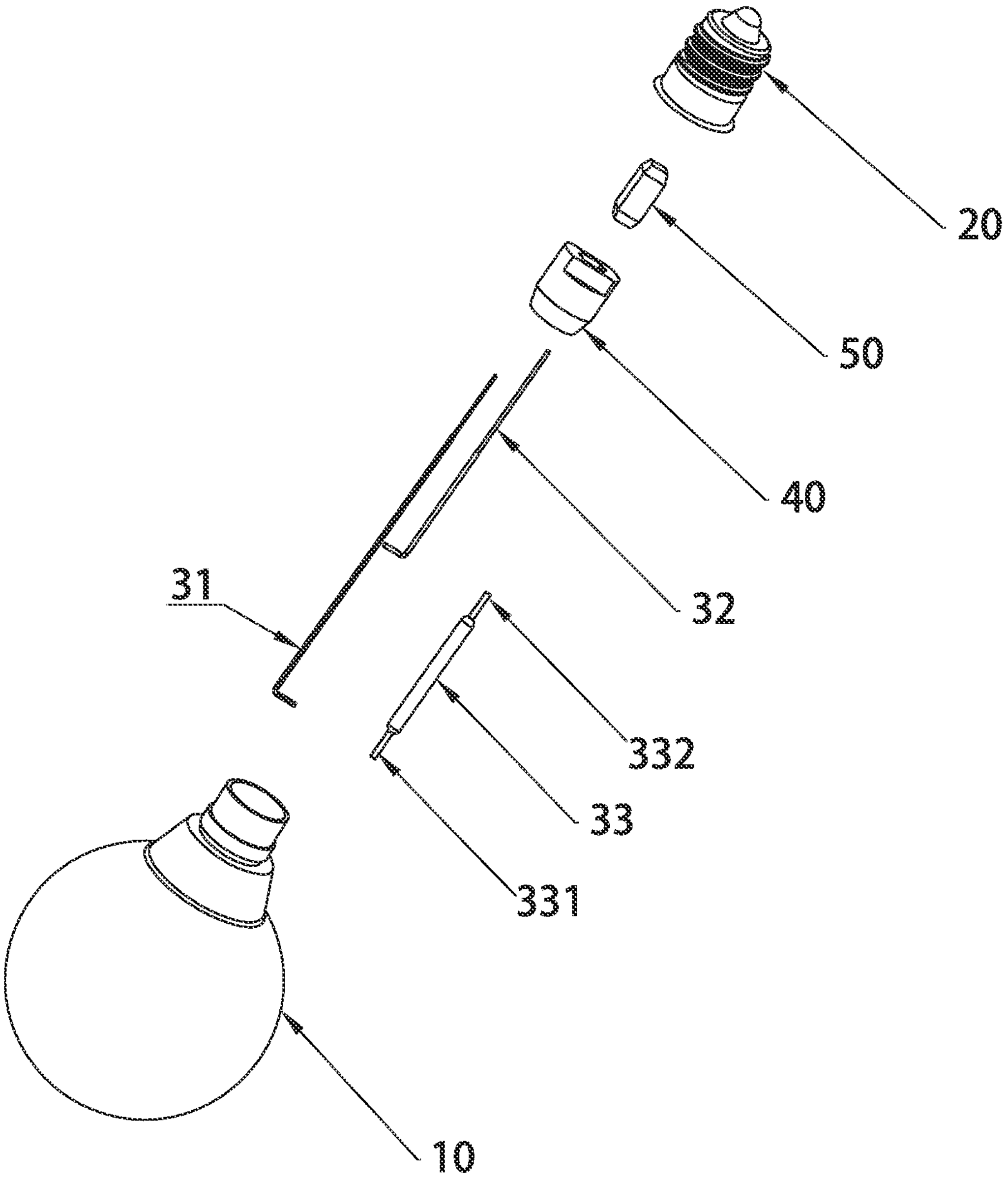
FIG. 3 is an exploded view of components of the LED bulb according to FIG. 1.
Figure 4:
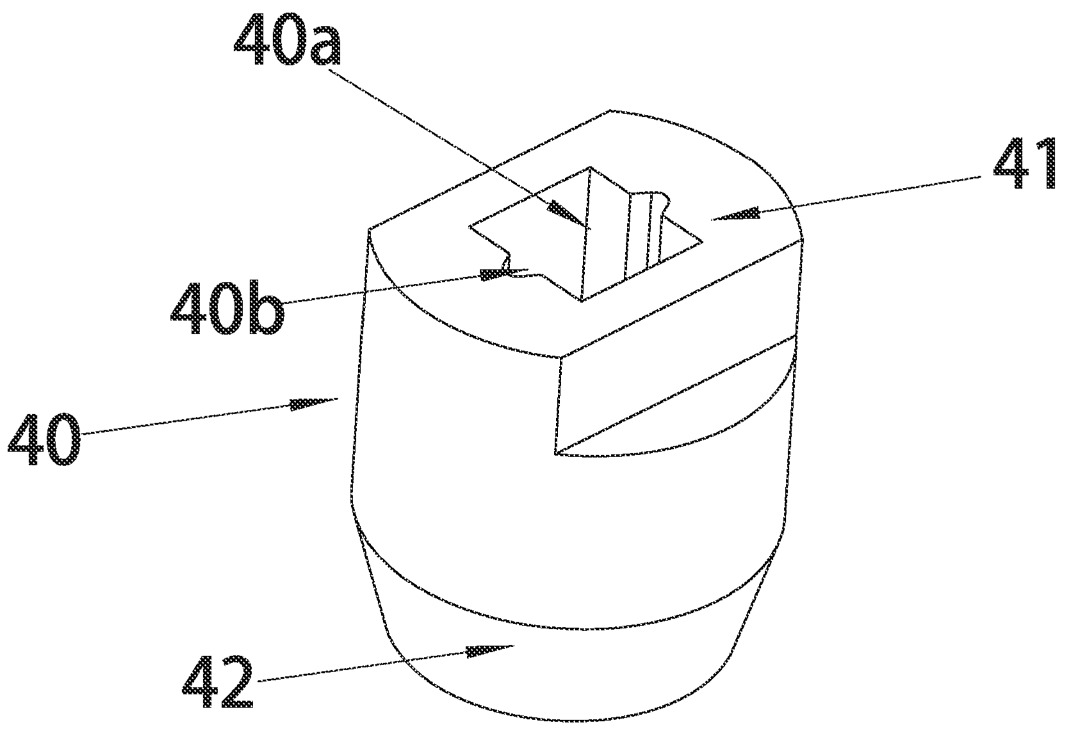
FIG. 4 is a structural schematic diagram of a plug provided by an embodiment of the present application.

An embodiment of the present application provides an LED bulb, as shown in FIGS. 1-4. The bulb includes a lampshade 10, a lamp holder 20, and a lampwick plug assembly, and the lampwick plug assembly includes an LED lampwick 30, a plug 40 and a plug body 50.

The lampshade 10 can also be called lamp housing or bulb shell, it has a chamber 10*a* for accommodating the LED lampwick 30 and is formed as a bubble or an inner structure of a balloon on the whole, and an opening 10*b* communicated with the chamber 10*a* is formed at the end with a smaller cross-sectional area.

The plug 40 is mounted on the inner side of the opening 10*b*. In order to guarantee stable mounting of the plug 40, an annular limiting groove is formed on the inner wall of the opening 10*b*, and a limiting boss fitting in with the annular limiting groove for limiting is arranged on the outer side of the plug. In order to facilitate plugging of the plug 40 into the opening 10*b*, a conical portion 42 is formed at one end of the plug 40 near the chamber 10*a*.

A through hole 40*a* is formed in the middle part of the plug 40, the through hole 40*a* is communicated with the chamber 10*a*, a glue injection surface 41 is formed at the end of the plug 40 away from the chamber 10*a*, the glue injection surface 41 is lower than the end face of the opening 10*b*, and the glue surface after glue injection is flush with the end face of the opening 10*b*.

According to the general structure of the prior art, the opening 10*b* is generally circular, therefore, the plug 40 is cylindrical as a whole, the glue injection surface 41 thereof is a circular surface, and the glue injection surface 41 and the inner side wall of the opening 10*b* form a cylindrical glue injection cavity with one end open. After glue is injected, the glue surface is flush with the end face of the opening 10*b*, that is, the above cylindrical glue injection cavity is completely filled with the glue, and the lower end thereof can completely close the gap between the plug 40 and the side of the opening 10*b*, such that the inner chamber of the lampshade 10 is isolated from the outer space of the lampshade 10.

The plug body 50 is plugged in the inner side of the through hole 40*a* and is configured to fix the LED lampwick 30 on the plug 40.

In order to share voltage and limit current, a plurality of resistors are connected in series at one end of the LED lampwick in the prior art, which not only increases the cost of product materials, but also needs a process of installing a fixed resistor in the production process, increasing the assembly cost and reducing the production efficiency.

Specifically, the LED lampwick 30 includes long metal wire 31, short metal wire 32 and LED filament 33, and the LED filament 33 is packaged with a conductive wire matching the resistance value. The LED filament 33 is arranged in an axial direction of the opening 10*b*, and has a near end 331 and a far end 332. The long metal wire 31 is connected to the far end 332 and extends from the through hole 40*a* to the outside of the plug 40, the short metal wire 32 is connected to the near end 331 and extends from the through hole 40*a* to the outside of the plug 40, and the long metal wire 31 and the short metal wire are both fixed on the plug 40 through the plug body 50.

A resistor collected in series on one side of the LED lampwick is replaced by a conductive wire, and the resistor matching the LED lampwick 30 has been built into the LED lampwick before it leaves from the packaging factory, which saves the material cost of the resistor itself, simplifies the assembly process, and reduces the manufacturing cost of the product.

The long metal wire 31 and the short metal wire 32 are both fixed on the plug 40 through the plug body 50. In some preferred embodiments of the present application, the through hole 40*a* is a hole with a rectangular cross section, grooves 40*b* are formed on opposite sides of inner walls of the through hole 40*a*, the long metal wire 31 and the short metal wire 32 correspond to a groove 40*b* respectively, side walls of the plug body 50 presses the long metal wire 31 and the short metal wire 32 tightly against inner walls of the corresponding grooves 40*b*, and the plug body 50 is thus a square plug, which can effectively realize positioning and grasping, and facilitate the introduction of automatic production process.

The lamp holder 20 is covered at outer side of the opening 10*b* of the lampshade 10.

In the prior art, after the opening of glue injection cavity at one end of the plug is filled with waterproof glue, the end face of the glue injection cavity of the plug opening is higher than the opening surface of the lampshade, the waterproof glue thus cannot reach the opening of the lampshade, in which case, the inner space of the lampshade of the bulb will still be connected with the external space through the outer profile of the glue injection cavity of the plug opening, such that waterproof effect of the bulb cannot meet the expectations, which seriously affects the service life of the bulb. The present application provides an LED bulb, the glue injection surface after glue injection is flush with the end face of the lampshade opening through the position design of the glue injection surface, the waterproof structure is thus optimized, such that the glue can completely close the gap between the plug and the side of the opening, the inner chamber of the lampshade is isolated from the outer space of the lampshade, thereby achieving a better waterproof effect of components inside the bulb.

What is claimed is:

1. A lampwick plug assembly comprising: an LED lampwick, a plug and a plug body; the plug body is plugged in the inner side of the through hole and is configured to fix the LED lampwick on the plug, the LED lampwick comprises an LED filament, long metal wire and a short metal wire, the LED filament is arranged in an axial direction of the through hole, and has a near end and a far end, the long metal wire is connected to the far end and extends from the through hole to the outside of the plug, the short metal wire is connected to the near end and extends from the through hole to the outside of the plug, and the long metal wire and the short metal wire are both fixed on the plug through the plug body;

wherein the through hole is a hole with a rectangular cross section, grooves are formed on opposite sides of inner walls of the through hole, the long metal wire and the short metal wire correspond to a groove respectively.

2. The lampwick plug assembly according to claim 1, wherein a conical portion is formed at one end of the plug near the LED filament.

3. An LED bulb, comprising a lampshade, a lamp holder and the lampwick plug assembly according to claim 1; wherein the lampshade has a chamber for accommodating components of the LED lampwick; an opening communicated with the chamber is formed at one end of the lampshade; the plug is mounted on the inner side of the opening, the through hole is communicated with the chamber, a glue injection surface is formed at an end of the plug away from the chamber, and the glue surface after glue injection is flush with an end face of the opening; and the lamp holder is covered at outer side of the opening of the lampshade.

* * * * *